United States Patent [19]

Taylor

[11] 4,035,130

[45] July 12, 1977

[54] GOLF GRIP MOLDING MACHINE

[76] Inventor: James H. Taylor, 12 - 8th St., Barberton, Ohio 44203

[21] Appl. No.: 736,064

[22] Filed: Oct. 27, 1976

Related U.S. Application Data

[63] Continuation of Ser. No. 583,857, June 4, 1975, abandoned.

[51] Int. Cl.² ............................................. B29C 7/00
[52] U.S. Cl. ................................ 425/437; 425/438
[58] Field of Search ............... 425/436 R, 437, 438, 425/450.1, 468, DIG. 44

[56] References Cited

U.S. PATENT DOCUMENTS 3,100,913  8/1963  De Matteo .................... 425/437 X
3,898,314  8/1975  Church ......................... 425/437 X

*Primary Examiner*—Richard B. Lazarus
*Attorney, Agent, or Firm*—Hamilton, Renner & Kenner

[57] ABSTRACT

A machine for molding a plurality of tubular articles and gang stripping them in one operation. The mandrels for molding the articles are mounted between the mold platens in a frame having a front cross bar which has cavities forming the ends of the articles. When the platens are separated and the mold opened, the frame is moved laterally of the machine and the cross bar is automatically moved away from the ends of the articles to a removable position. A stripping rack is then moved manually into position to clamp and strip all of the articles simultaneously from the mandrels.

11 Claims, 12 Drawing Figures

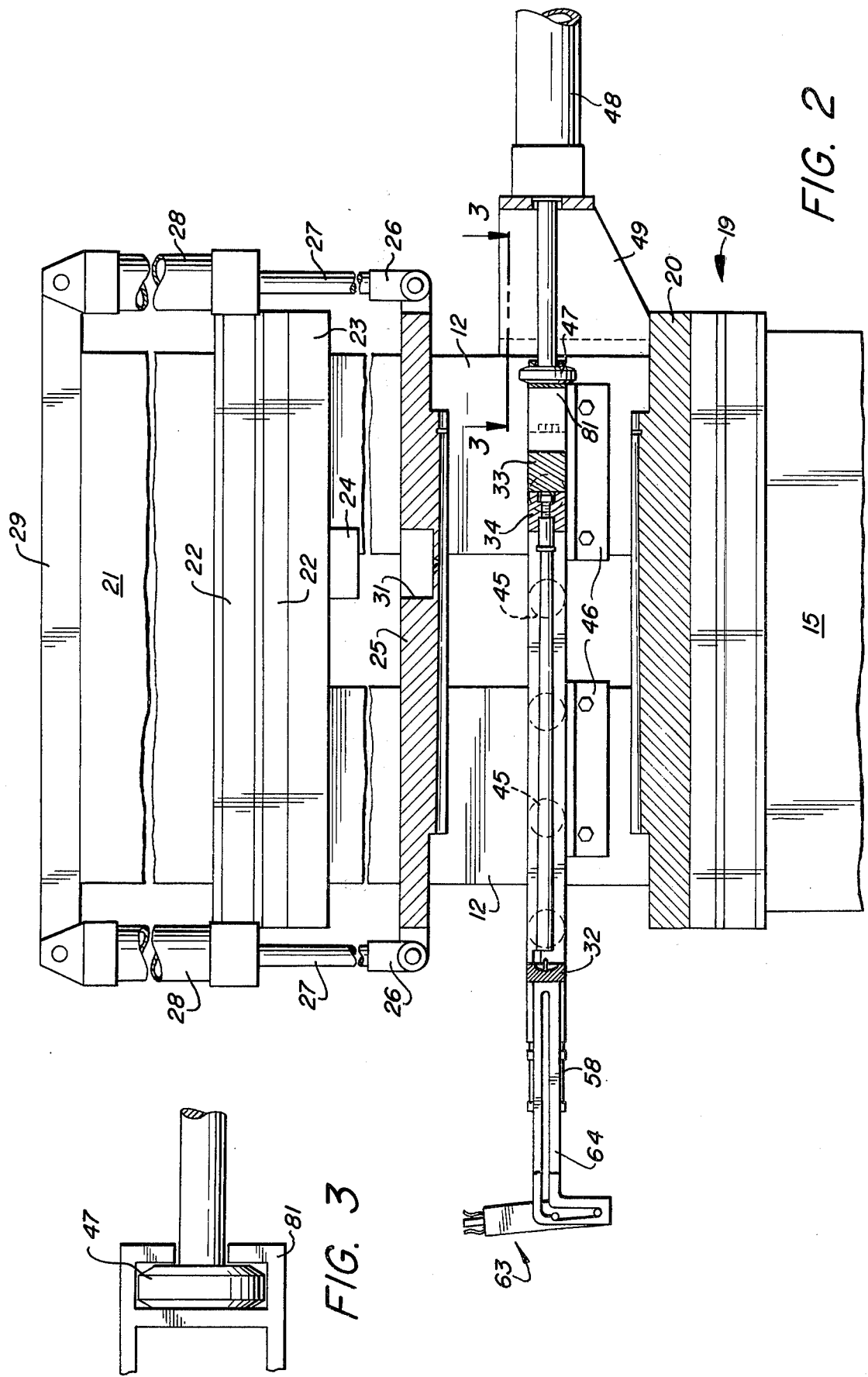

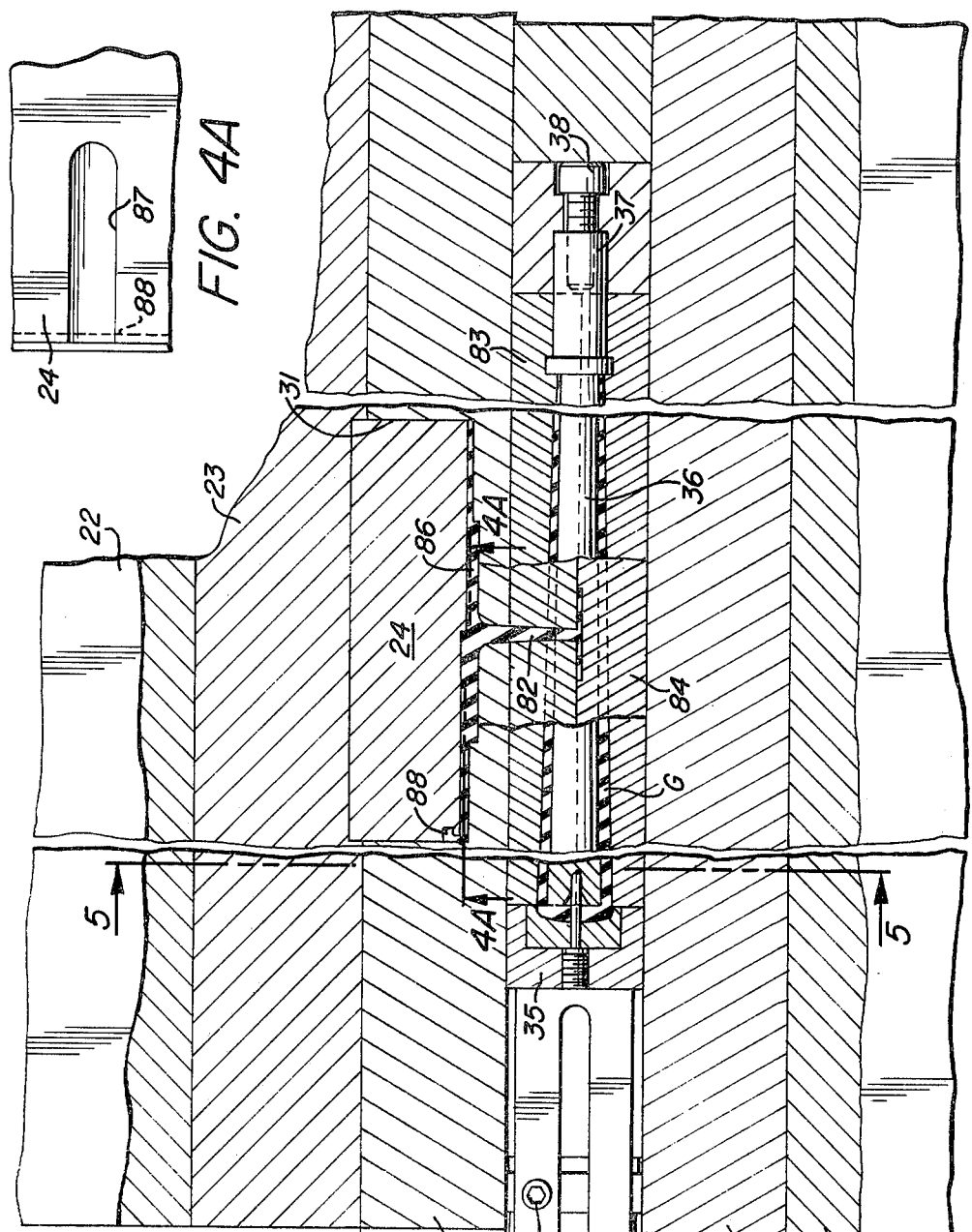

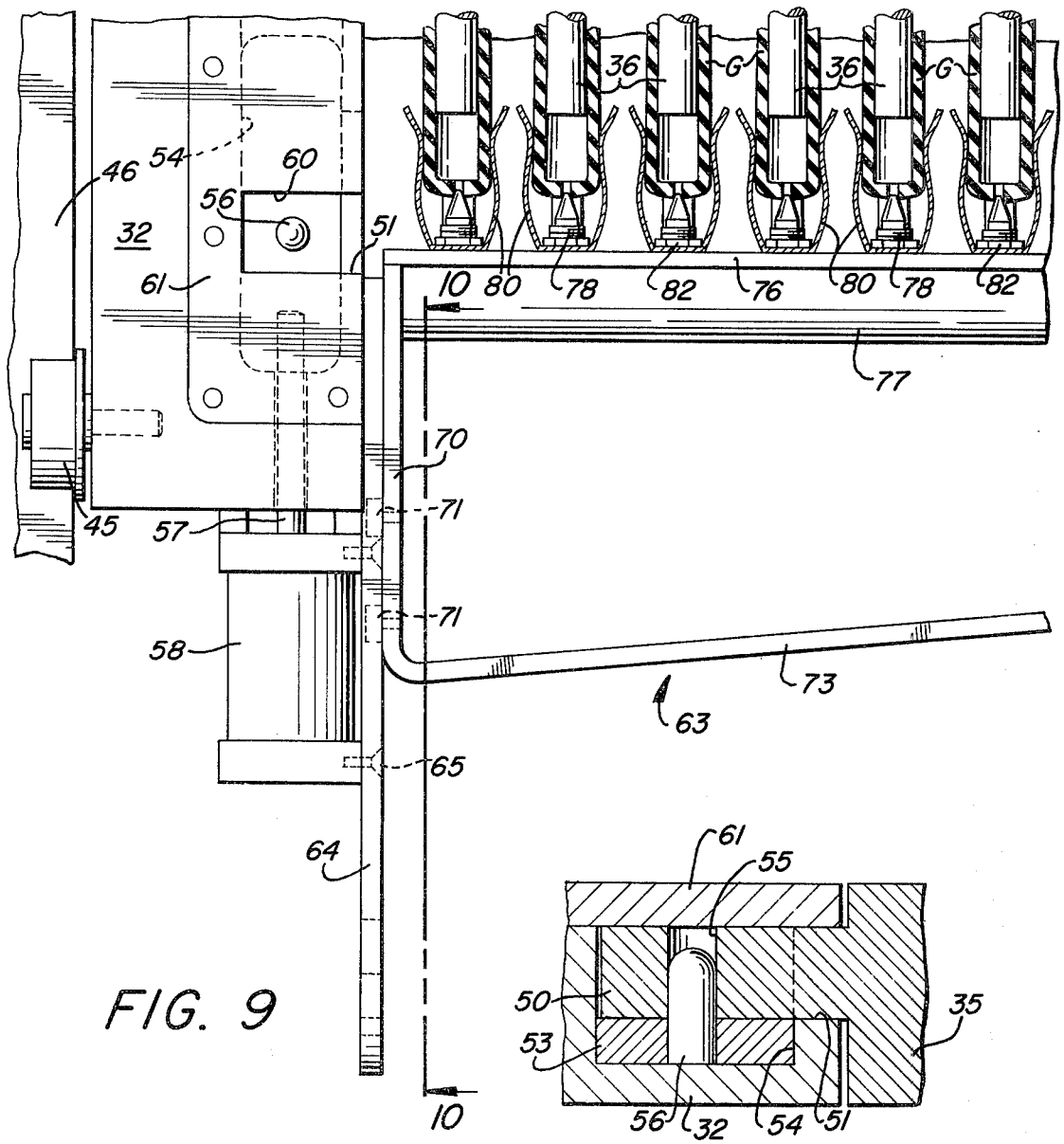
FIG. 9
FIG. 11
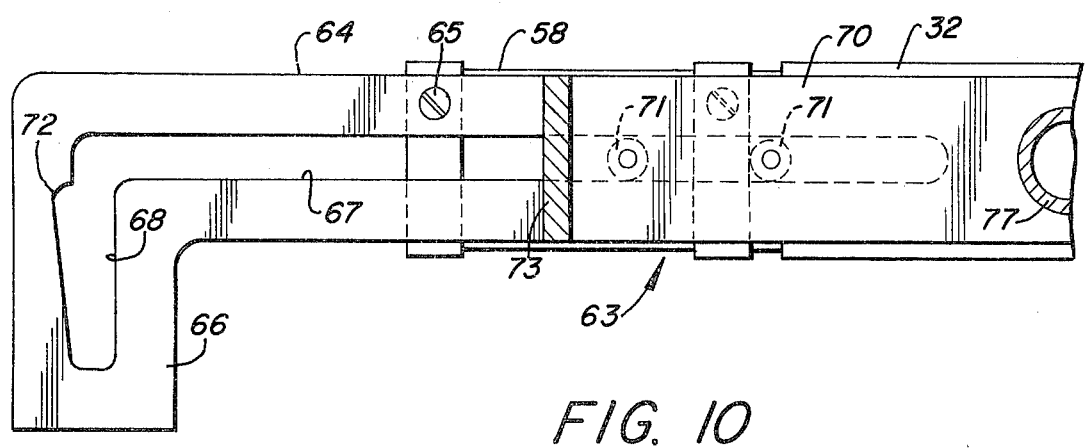
FIG. 10

GOLF GRIP MOLDING MACHINE

CROSS REFERENCE TO RELATED APPLICATION

This application is a continuation of my application Ser. No. 583,857, filed June 4, 1975, now abandoned.

BACKGROUND OF THE INVENTION

Prior conventional practice in molding a plurality of tubular articles such as golf club grips includes the use of a mold assembly in a vulcanizing press, the mold assembly including a mandrel frame between the mold plates in which the mandrels are removably mounted in opposite end bars of the frame. When the press is opened after curing, the whole mold assembly is pulled bodily onto a worktable and manually opened to expose the mandrels with the tubular grips molded thereon. The mandrels are then removed individually and mounted on a stripping rack and the grips are successively stripped from the mandrels by applying air pressure into the ends of the grips.

This practice is not only slow and laborious but substantial heat is lost from the mold parts during the mandrel removal and stripping operations, which heat must be replaced at the start of the next molding operation.

SUMMARY OF THE INVENTION

The present molding machine provides for an automatic molding operation in which all of the mold parts, except for the front cap bar of the mandrel frame, remain in the press at all times and when the mold opens the mandrel frame moves laterally to stripping position were the front cap bar may be removed manually and replaced by the gang stripping means for stripping all of the tubular grips simultaneously from the mandrels without removing the mandrels from the frame.

It is an object of the present invention to provide a molding machine adapted for automatically molding a plurality of tubular articles simultaneously and moving the mandrel frame laterally to a gang stripping position when the mold parts are separated.

Another object is to provide novel means automatically moving the front cap bar of the mandel frame to removable position when the mold parts are separated.

A further object is to provide novel stripping means movable into registry with the ends of the mandrels for simultaneously stripping all of the tubular articles from the mandrels.

These and other objects are accomplished by the improvements comprising the present invention, a preferred embodiment of which is shown by way of example in the accompanying drawings and described in detail in the following specification. Varius modifications and changes in details of construction are comprehended within the scope of the appended claims.

BRIEF DESCRIPTION OF THE DRAWINGS

FIG. 2 is a partial vertical sectional view thereof with parts in elevation.

FIG. 3 is an enlarged partial plan elevation on line 3—3 of FIG. 2.

FIG. 4 is an enlarged partial sectional view on line 4—4 of FIG. 5 showing the mold parts closed.

FIG. 4A is a partial sectional view as on line 4A—4A of FIG. 4.

FIG. 9 is a view similar to FIG. 7, showing the stripping means moved into contact with the ends of the molded grips in position to strip them from the mandrels.

FIG. 10 is a partial view on line 10—10 of FIG. 9, showing one of the guides for the stripping means.

FIG. 11 is a partial sectional view on line 11—11 of FIG. 8.

DESCRIPTION OF A PREFERRED EMBODIMENT

Figure 1:
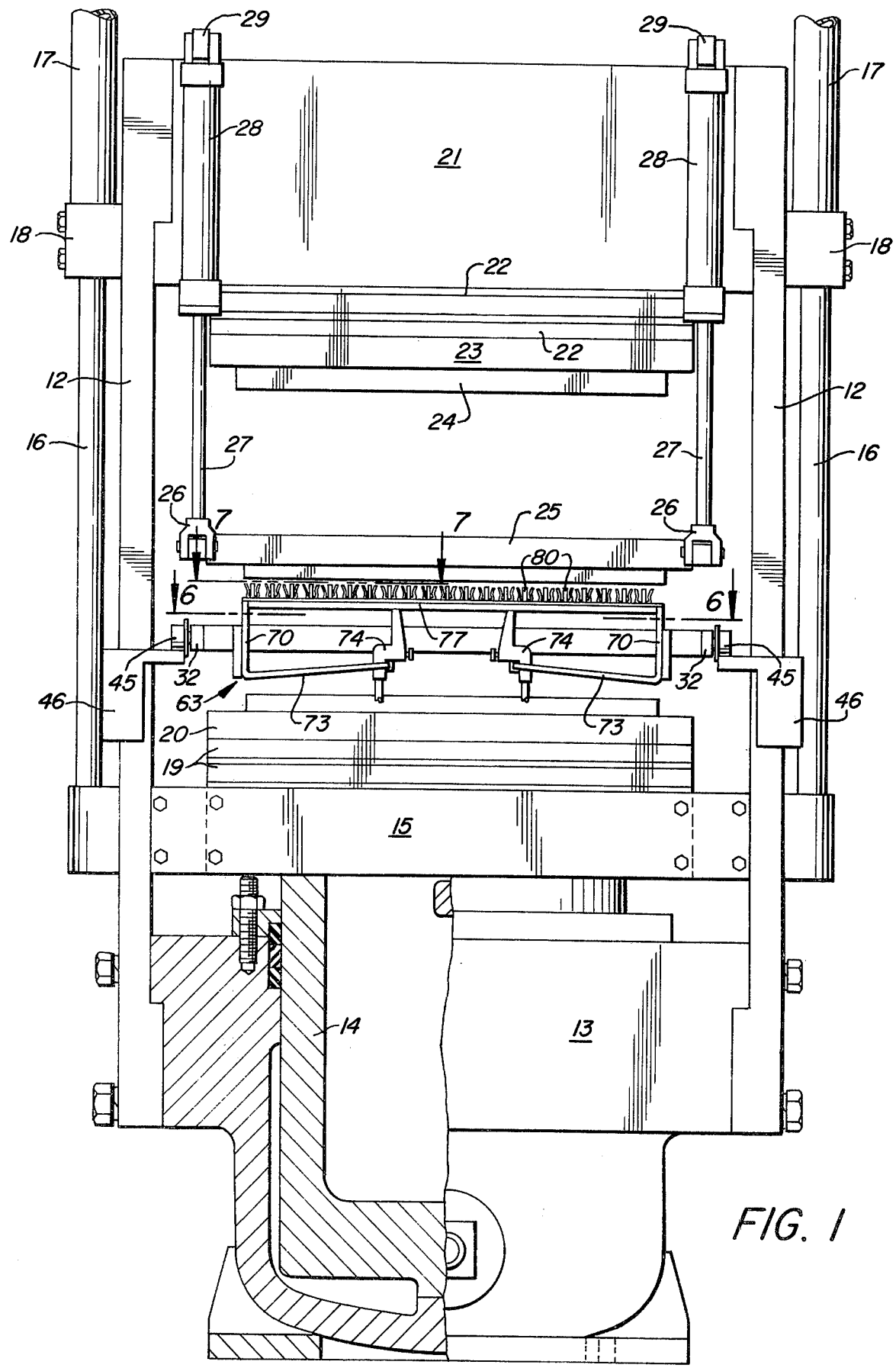
FIG. 1 is a front elevation, partly in section, of the novel molding machine, showing the mold parts in separated or open position.

Referring to FIGS. 1 and 2, the molding press shown therein has vertical side frame members 12 which are connected at their lower ends to a hydraulic cylinder 13 having a ram 14 therein which is moved vertically upward by fluid pressure in a usual manner. A horizontal platform 15 is supported on the ram and has vertical piston rods 16 rising from its sides which are operable by fluid cylinders 17 carried on the frame members 12 by brackets 18.

A bottom heating platen assembly having heating elements (not shown) sandwiched between plates 19 is carried on platform 15 and supports the bottom mold platen 20. The upper ends of frame members 12 are connected to the head 21 of the press on the underside of which is attached the upper heating platen assembly having heating elements (not shown) sandwiched between plates 22. An upper stationary mold plate 23 is carried on the lower heating plate 22 and has a rectangular plunger 24 depending therefrom. The parts thus far described are conventional and per se form no part of the present invention.

In the improved machine of the present invention, the upper rectangular mold platen 25 which mates with the bottom mold platen 20 is pivotally connected by clevises 26 at its four corners to piston rods 27 operable by cylinders 28 pivoted at 30 at their upper ends on cross bars 29 spanning the head 21 of the press. The lower ends of the cylinders 28 hang free from the pivots 30 and the upper mold platen 25 is independently movable vertically by actuating the piston rods 27. The upper mold platen 25 has a rectangular well 31 therein adapted to receive the plunger 24 with a close sliding fit.

Figure 6:
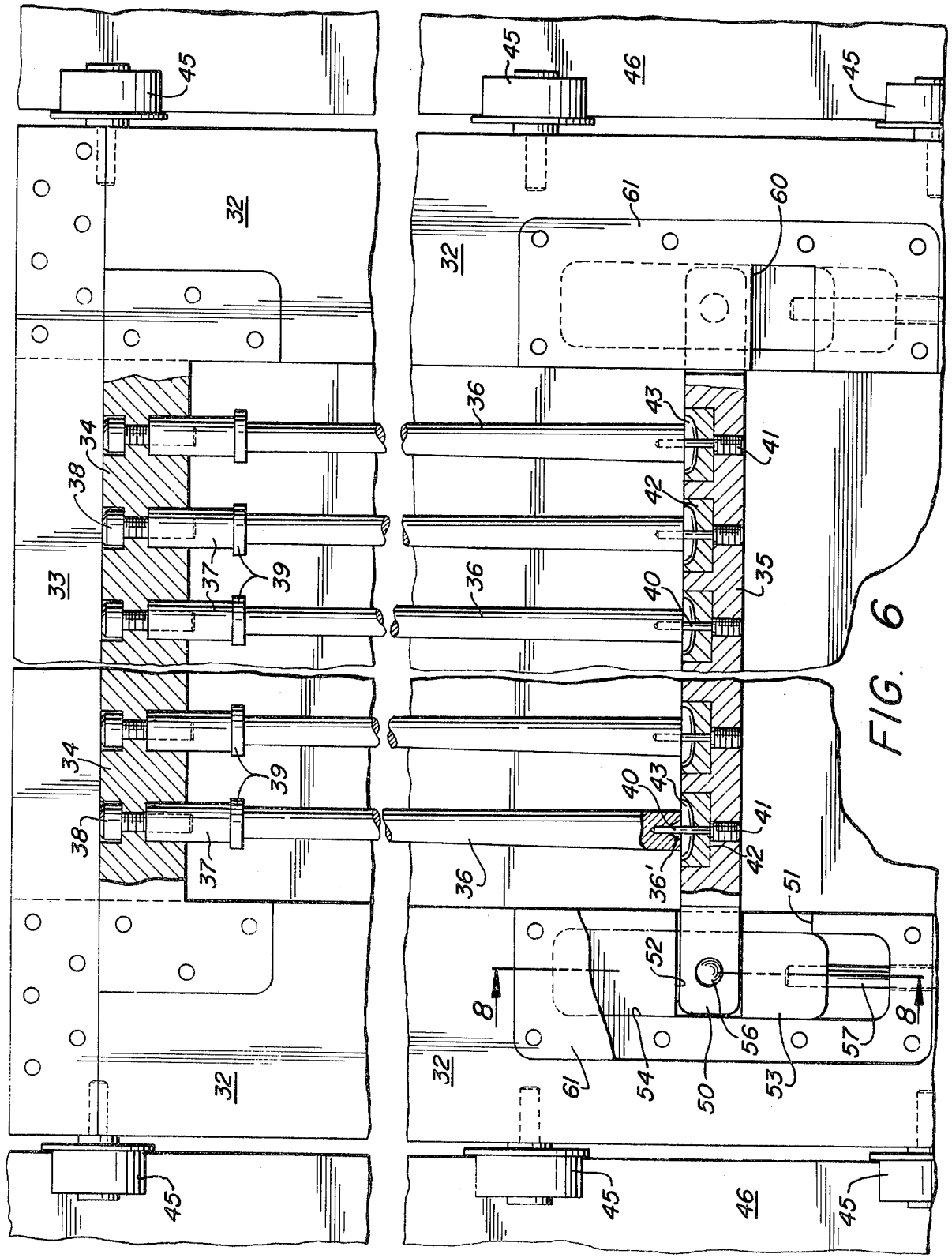
FIG. 6 is a plan sectional view on line 6—6 of FIG. 1 showing the front cap bar of the mandrel frame in contact with the ends of the mandrels and the stripping means removed.

The frame in which the mandrels or cores are mounted is located between the upper and lower mold platens 25 and 20, respectively. As seen in FIG. 6, the mandrel frame is parallel to the mold platens and comprises two side bars 32 connected by a rear outer cross bar 33 and a rear inner cross bar 34. A front cross bar 35 is removably mounted in the side bars 32. The bar 35 may be termed a cap molding bar as it carries the mold cavities for the cap ends of the grips molded on the mandrels. The mandrels or cores 36 are supported at their rear ends on inner cross bar 34 and at their front ends on the transverse cap bar 35.

Perferably, the rear ends of the mandrels 36 have cylindrical portions 37 which are secured in sockets in cross bar 34 by screw studs 38. The front ends of cylindrical portions 37 have collars 39 forming shoulders abutting the rear smaller ends of the tapered mandrels. The cylindrical portions 37 and collars 39 serve to register the mold cavities and cores when the mold platens are brought together and the collars turn any flash formed at the adjacent ends of the mandrels outwardly to facilitate buffing off the flash.

The front larger ends of the tapered mandrels 36 terminate at the inner face of the cap bar 35 and are supported on centering pins 40 extending through the bar into counterbores 36' in the ends of mandrels 36, and having heads 41 screwed in the bar from its front face. Surrounding the pins in the rear face of the bar are mold inserts 42 having cavities 43 facing the adjoining ends of the mandrels for forming the end caps on the tubular grips which are molded on the mandrels.

The side bars 32 of the core frame have exterior rollers 45 journaled therein which, in the open position of the mold platens shown in FIGS. 1 and 2, are supported on side brackets 46 secured to the side frame members 12. As shown in FIG. 2, when the mold is opened the frame is rolled laterally outward to an accessible position by a piston 47 operated by fluid cylinder 48 supported on a bracket 49 mounted on frame members 12. This movement is coordinated with the mold opening movement.

The front cap bar 35 is slidably and removably mounted in side bars 32. As shown in FIGS. 6 – 8 and 11, the ends 50 of the cap bar 35 extend through side slots 51 on the inner faces of the side bars and are received in notches 52 in blocks 53 slidable in slots 54 extending longitudinally of the side bars. The ends 50 have apertues 55 which fit over locating pins 56 in the slide blocks 53, and piston rods 57 secured in the blocks and operated by fluid cylinders 58 mounted on the front faces of the side bars 32 constitute fluid motors.

Figure 7:
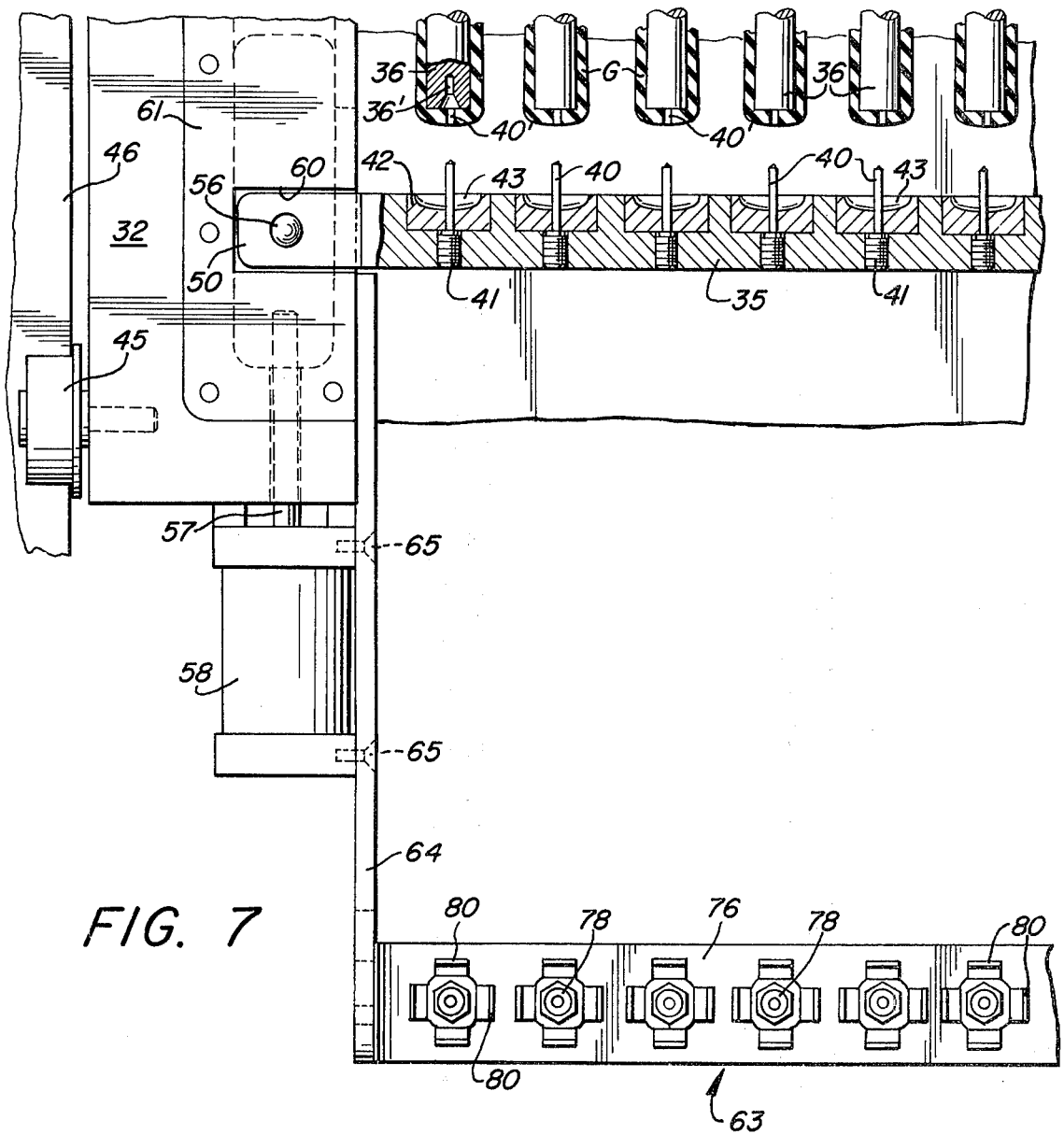
FIG. 7 is a similar view showing the front cap bar moved away from the mandrels and showing the stripping means in plan elevation.
Figure 8:
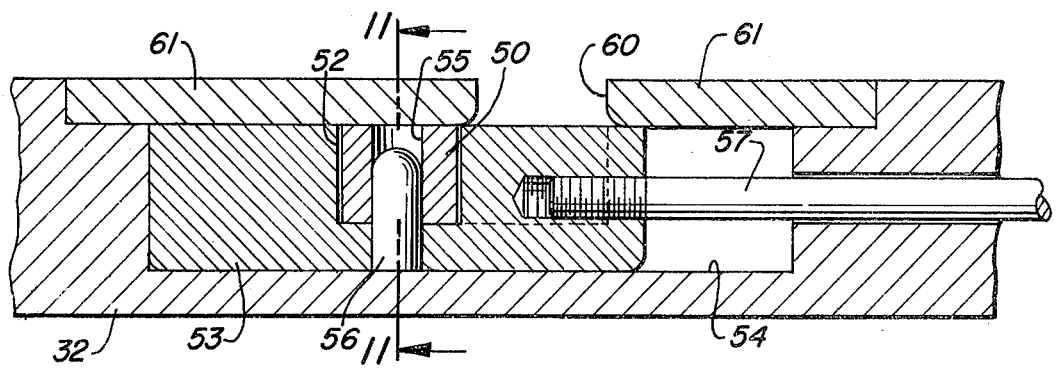
FIG. 8 is a partial sectional view on line 8—8 of FIG. 6.

When the mandrel frame 25 is moved outwardly to the position of FIG. 2, conventional control mechanism simultaneously actuates the piston rods 57 to move the slide blocks 53 and front cap bar 35 forwardly away from the ends of the mandrels to the position of FIGS. 2 and 7, where the cap bar ends 50 register with slots 60 in the plate 61 covering the slots 54 and the slide blocks 53, whereupon the cap bar 35 can be manually lifted out and put to one side during the ensuing operation of stripping the molded tubular grips G from mandrels 36. If the end caps are required to be of different composition than the tubular grips, slugs of uncured material of the desired composition may be loaded in cavities 43 before the bar 35 is replaced. In either case the pins 40 from enter holes 40' in the molded end caps.

The gang stripping mechanism for simultaneously stripping all of the molded grips from the mandrels 36 is best shown in FIGS. 1, 4, 7, 9 and 10 and comprises a rack frame indicated generally at 63 extending transversely between the front ends of mandrel frame side bars 32 and movably mounted on guide plates 64 abutting the front ends of said side bars 32. The guide plates 64 are preferably secured to the ends of fluid cylinders 58 by screws 65 and have downturned angular ends 66. Horizontal cam slots 67 are provided in the plates 64 and the slots 67 are connected to vertical cam slots 68 in the ends 66.

The rack frame 63 has side bars 70 each carrying a pair of spaced-apart outer cam rollers 71 which roll in the cam slots 67, 68 and the cam slots 68 each have a notch 72 therein for engaging and restraining the rear rollers of each pair when the rack is in the outer upright position of FIGS. 4 and 7. The rack side bars 70 are turned inwardly at their outer ends to form portions 73 for supporting air valves 74 connected to a compressed air supply conduit 75 (FIG. 1).

The opposite or inner ends of side bars 70 are connected by a cross bar 76 and a manifold conduit 77 is welded to and coextensive with said cross bar 76. As seen in FIG. 4, the air valves 74 are connected to the manifold 76, and the manifold is connected to a row of nozzles 78, which as shown in FIG. 9 are adapted to register one with the center hole 40' in each end cap of the grips G on the mandrels.

Surrounding each nozzle 78 is a clip having spring prongs or fingers 80 which are adapted to be forced over and resiliently grip the end portions of the tubular grips G as indicated in FIG. 9. The prongs 80 are each connected together by a center web portion through which the nozzle 78 extends and the web is clamped against the bar 76 by a nut 82 screwed onto the nozzle.

During the molding operation the rack frame is positioned in an upright position at the outer ends of the guide plates 64, as shown in FIGS. 4 and 7, and after the molding operation and removal of cap bar 35 the operator manually moves the rack frame slightly forward to free the upper cam roller 71 from notch 72, and then moves the frame upwardly and forwardly to the position of FIG. 9 to register the nozzles 78 with the end holes in the molded grips G and resiliently engage the prongs 80 around the grips. The air is then turned on and the operator simultaneously pulls the rack frame outwardly away from the ends of the mandrels, the grips all being instantaneously stripped therefrom and held in the prings 80 for quick removal.

In the molding operation, assuming that the machine is in the open position of FIG. 1 with the ram 14 at the bottom of its stroke, and the mandrel frame in position to register with the upper and lower mold platens 25 and 20, the operator first loads uncured rubber or other elastomeric material into the well 31 in a predetermined approximate amount. The upper mold plate 22 and the lower mold platen 20 are constantly maintained at desired curing temperature by the upper and lower heating platen assemblies 22 and 19, respectively, in a well-known manner.

The operator then actuates the hydraulic ram causing it to move upwardly into abutment with the mandrel frame after which it carries the frame upwardly into mating abutment with the upper mold platen 25 and then continues upward until the plunger 24 is received into the well 31, applying heat and pressure to the uncured stock therein. As the mandrel frame is carried upward, a rectangular enclosure 81 surrounding piston 47 and formed in the rear cross bar 33 of the mandrel frame (FIG. 3) moves upwardly and disengages from the piston.

Figure 5:
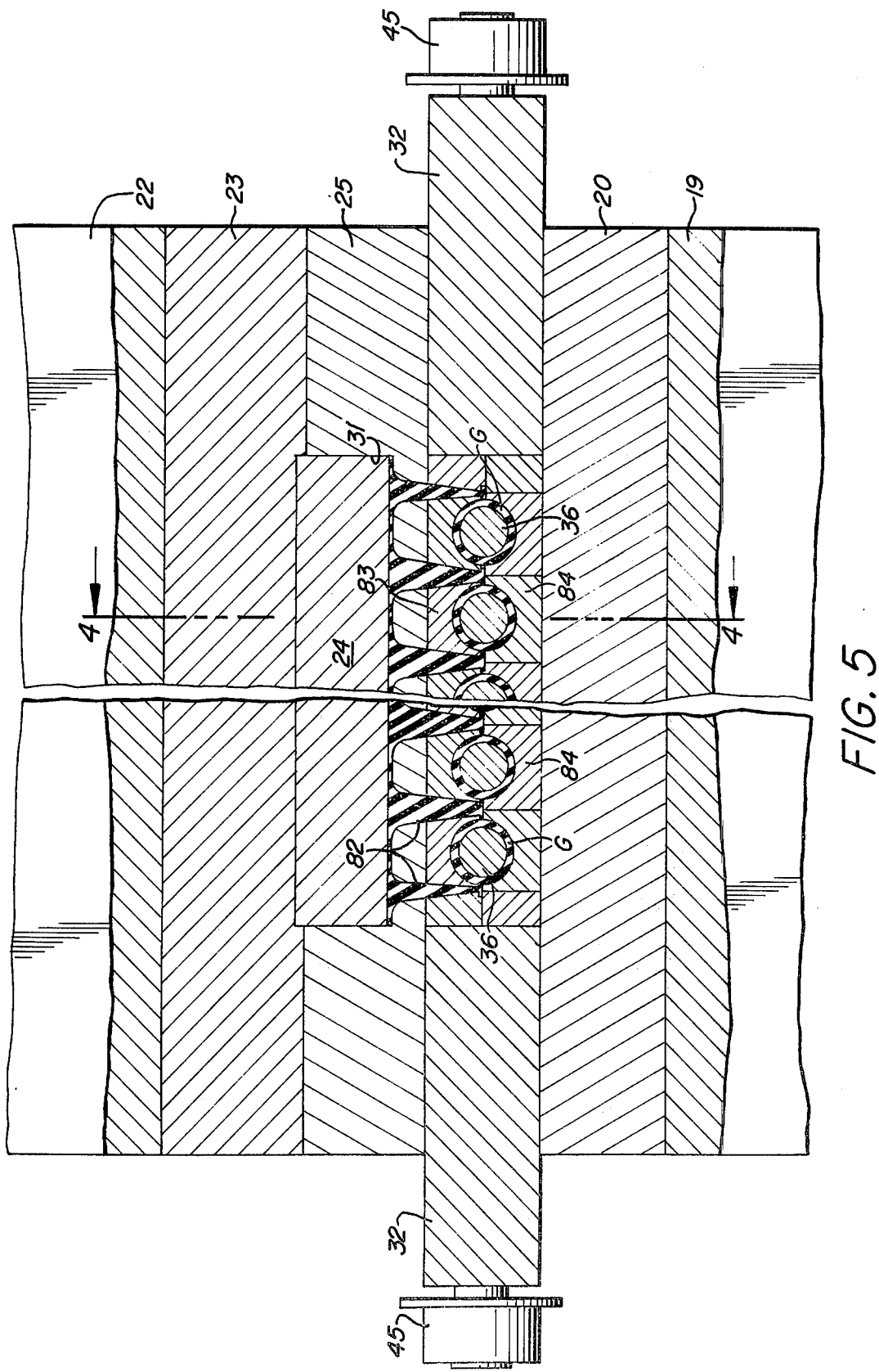
FIG. 5 is a partial sectional view on line 5—5 of FIG. 4.

Referring to FIGS. 4 and 5, the bottom wall of the well 31 is provided with a plurality of tapered sprue holes 82 which are continued downward through cavity plates 83 attached to the bottom of mold platen 25, and the sprue holes terminate at the parting line between the cavity plates 83 and mating cavity plates 84 attached to the upper surface of mold platen 20, a clearance being provided between the cavity plates 83 and 84 adjacent the medial portions of the mandrels 36 to channel the rubber being forced to flow through the sprue holes into and around the tubular spaces formed between the mandrels and the cavity plates.

As shown in FIG. 4, when the mold plates 23 and 25 are in full abutment there is a predetermined clearance between the bottom of plunger 24 and the bottom of well 31, forming a thin sheet of material 86 attached to the material in the sprue holes. As shown in FIGS. 4 and 4A a shallow groove 87 is formed in the bottom surface of plunger 24 which communicates at the front edge of the plunger with an undercut groove 88 on the front face of the plunger. The material formed in the bottom groove 87 and undercut groove 88 attaches the sheet 86 and the material filling the sprue holes to the plunger 24 so that all of that material is stripped from the upper mold platen when the mold plates are separated and can then easily be peeled from the plunger.

After the curing cycle is completed, the pressure on the ram is relieved and the cylinders 17 are energized to force the platform 15 and ram downwardly. Simultaneously, the cylinders 28 are energized to force the upper mold platen 25 downwardly until the bottom of the stroke is reached. The lower mold platen 20 and mandrel frame continues downwardly until the rollers 45 abut the brackets 46 and the enclosure 81 surrounds piston 47, whereupon the lower mold platen 20 separates from the mandrel frame and moves with platform 15 to its lowermost position.

When this position is reached a limit switch (not shown) is tripped to energize the piston 47 and move the mandrel frame outwardly toward the front of the machine to the accessible position of FIG. 2, and at the same time the cylinders 58 are energized and the cap bar 35 is moved forwardly to its removable position in the manner previously described.

It will be apparent that an improved molding machine has been provided for molding a plurality of tubular articles simultaneously and gang stripping the articles from the molding mandrels without the necessity of removing the mandrels, thereby accomplishing a substantial saving in time and greatly reducing heat loss in the molds.

I claim:

1. In a molding machine having upper and lower mold platens containing mating cavity plates and a ram operated by fluid pressure to bring the cavity plates together in mating relation, a mandrel frame between and parallel to said mold platens, a plurality of elongated mandrels mounted in parallel relationship within said frame for defining tubular articles within the mold cavities, means on the machine for supporting said mandrel frame when the mold platens are separated, a cap molding bar having cavities for forming the ends of said tubular articles and mounted in said mandrel frame transversely of the mandrels at one end thereof for movement in the plane of said mandrel frame toward and away from the ends of said mandrels, said cap bar in abutment with said cavity plates at said one end of the mandrel frame during molding, means for moving said cap bar away from the ends of the mandrels when said cavity plates are separated, and gang stripping means for stripping the molded articles from the mandrels and movably mounted on said frame for movement into and out of engagement with the exposed ends of the mandrels when the cap bar has been moved away from them.

2. In a molding machine as defined in claim 1, wherein the movement of the cap bar away from the ends of the mandrels moves the bar to a removable position in the frame for removal of the bar from the frame.

3. In a molding machine as defined in claim 1, wherein the means for moving the cap bar laterally comprises fluid pressure motors operatively mounted in said frame.

4. In a molding machine as defined in claim 1, wherein the gang stripping means comprises a fluid pressure manifold having a plurality of nozzles for registering with the ends of the tubular articles molded on said mandrels, and means on the nozzles for gripping the tubular articles at their ends.

5. In a molding machine as defined in claim 4, wherein the gripping means comprises spring clips for gripping the tubular articles adjacent their ends.

6. In a molding machine as defined in claim 1, wherein the upper mold platen is independently supported for vertical movement on the machine, and means is provided for vertically moving said upper mold platen independently of said ram.

7. In a molding machine as defined in claim 6, wherein the movement of the cap bar away from the ends of the mandrels moves the bar to a removable position in the frame.

8. In a molding machine as defined in claim 6, wherein the mandrel frame is movably supported on the machine for movement in a plane parallel to said cavity plates when the cavity plates are separated, and means is provided on the machine for moving said frame.

9. In a molding machine as defined in claim 8, wherein the movement of the cap bar away from the ends of the mandrels moves the bar to a removable position in the frame for removal of the bar from the frame.

10. In a molding machine as defined in claim 1, wherein the mandrel frame is movably supported on the machine when the cavity plates are separated for movement in a plane parallel to said cavity plates, and means is provided for moving said frame.

11. In a molding machine as defined in claim 10, wherein the movement of the cap bar away from the ends of the mandrels moves the bar to a removable position in the frame for removal of the bar from the frame.

* * * * *